(12) United States Patent
Chen

(10) Patent No.: US 8,020,024 B2
(45) Date of Patent: Sep. 13, 2011

(54) METHOD FOR PREVENTING ERRONEOUS RESETTING OF ELECTRONIC DEVICE DUE TO ELECTROSTATIC DISCHARGE

(75) Inventor: Ying-Tai Chen, Miao-Li (TW)

(73) Assignee: Chimei Innolux Corporation, Miao-Li County (TW)

( * ) Notice: Subject to any disclaimer, the term of this patent is extended or adjusted under 35 U.S.C. 154(b) by 1314 days.

(21) Appl. No.: 11/636,175

(22) Filed: Dec. 7, 2006

(65) Prior Publication Data

US 2007/0127174 A1    Jun. 7, 2007

(30) Foreign Application Priority Data

Dec. 7, 2005   (CN) .......................... 2005 1 0102301

(51) Int. Cl.
*G06F 1/04* (2006.01)
*G06F 1/14* (2006.01)
*H02H 9/00* (2006.01)
*G11B 5/33* (2006.01)
*G11B 5/127* (2006.01)

(52) U.S. Cl. ........................... 713/502; 361/56; 360/323

(58) Field of Classification Search .................. 713/502; 361/56; 360/323
See application file for complete search history.

(56) References Cited

U.S. PATENT DOCUMENTS

| | | | | | |
|---|---|---|---|---|---|
| 4,556,851 | A | * | 12/1985 | Levine | ............................ 377/63 |
| 4,965,800 | A | * | 10/1990 | Farnbach | ...................... 714/724 |
| 4,978,869 | A | * | 12/1990 | Dias | ............................... 326/101 |
| 5,049,810 | A | * | 9/1991 | Kirby et al. | ..................... 324/156 |
| 5,156,025 | A | * | 10/1992 | Frucco | .......................... 68/12.02 |
| 5,255,146 | A | * | 10/1993 | Miller | ............................... 361/56 |

(Continued)

FOREIGN PATENT DOCUMENTS

DE    10301727 B3 *  7/2004

(Continued)

OTHER PUBLICATIONS

"NN80091646: Electrostatic Discharge Event Counter", Sep. 1, 1980, IBM, IBM Technical Disclosure Bulletin, vol. 23, Iss. 4, pp. 1646-1647.*

(Continued)

*Primary Examiner* — Faisal M Zaman
(74) *Attorney, Agent, or Firm* — Altis Law Group, Inc.

(57) ABSTRACT

An exemplary method for preventing an electronic device from erroneously resetting due to electrostatic discharge (ESD) involves an electronic device that includes a reset control pin. The method includes providing a timer, and setting a reset condition of the reset control pin. If the reset condition is satisfied, the electronic device resets. The method includes appropriately setting the reset condition of the electronic device. The reset condition can virtually never be satisfied by an ESD. Thus, the electronic device is efficiently prevented from erroneously resetting due to ESD.

12 Claims, 1 Drawing Sheet

U.S. PATENT DOCUMENTS

| | | | | |
|---|---|---|---|---|
| 5,365,783 | A * | 11/1994 | Zweifel | 73/304 C |
| 5,661,657 | A * | 8/1997 | Jordan et al. | 702/108 |
| 5,751,530 | A * | 5/1998 | Pelly et al. | 361/56 |
| 5,929,491 | A * | 7/1999 | Hebbeker et al. | 257/355 |
| 5,991,896 | A * | 11/1999 | Cho | 714/23 |
| 6,046,894 | A * | 4/2000 | Ida | 713/500 |
| 6,230,181 | B1 * | 5/2001 | Mitchell et al. | 718/100 |
| 6,301,743 | B1 * | 10/2001 | Cloud et al. | 15/339 |
| 6,307,480 | B1 * | 10/2001 | Sheldon et al. | 340/636.1 |
| 6,376,823 | B1 * | 4/2002 | Choi | 250/208.1 |
| 6,534,833 | B1 * | 3/2003 | Duvvury et al. | 257/355 |
| 6,540,533 | B1 * | 4/2003 | Schreiber | 439/159 |
| 6,556,408 | B1 * | 4/2003 | Zhang | 361/111 |
| 6,906,850 | B2 * | 6/2005 | Knipe | 359/295 |
| 6,917,188 | B2 * | 7/2005 | Kernahan | 323/282 |
| 7,085,118 | B2 * | 8/2006 | Inoue et al. | 361/119 |
| 7,098,511 | B2 | 8/2006 | Ker et al. | |
| 7,256,778 | B1 * | 8/2007 | Choi | 345/213 |
| 7,307,822 | B2 * | 12/2007 | Kitagawa et al. | 361/91.1 |
| 7,339,770 | B2 * | 3/2008 | Maloney et al. | 361/56 |
| 7,408,134 | B1 * | 8/2008 | Shaw et al. | 219/501 |
| 7,843,009 | B2 * | 11/2010 | Brunel et al. | 257/355 |
| 2002/0109535 | A1 * | 8/2002 | Caliboso | 327/143 |
| 2002/0149894 | A1 * | 10/2002 | Gregorius | 361/86 |
| 2004/0085696 | A1 * | 5/2004 | Mendoza et al. | 361/93.1 |
| 2006/0044715 | A1 * | 3/2006 | Muggler et al. | 361/56 |
| 2007/0146564 | A1 * | 6/2007 | Wu et al. | 349/40 |

FOREIGN PATENT DOCUMENTS

| | | | |
|---|---|---|---|
| EP | 335494 A2 * | 10/1989 | |
| GB | 2421603 A * | 6/2006 | |
| JP | 61218954 A * | 9/1986 | |
| JP | 07306236 A * | 11/1995 | |
| JP | 2003051862 A * | 2/2003 | |
| JP | 2003185992 A * | 7/2003 | |

OTHER PUBLICATIONS

"NN78112544: Use of Optical Isolator with Disk File Tester", Nov. 1, 1978, IBM, IBM Technical Disclosure Bulletin, vol. 21, Iss. 6, pp. 2544-2545.*

"NN9311467: Diagnostic Port for Computer Feature Cards", Nov. 1, 1993, IBM, IBM Technical Disclosure Bulletin, vol. 36, Iss. 11, pp. 467-468.*

"NN77101795: ESD Monitor", Oct. 1, 1977, IBM, IBM Technical Disclosure Bulletin, vol. 20, Iss. 5, p. 1795.*

* cited by examiner

METHOD FOR PREVENTING ERRONEOUS RESETTING OF ELECTRONIC DEVICE DUE TO ELECTROSTATIC DISCHARGE

FIELD OF THE INVENTION

The present invention relates to methods for protecting electronic devices from malfunction due to electrostatic discharge, and particularly to a method for preventing an electronic device from erroneously resetting due to the occurrence of electrostatic discharge.

GENERAL BACKGROUND

When two different electrically conductive objects make contact, electric charges may be transferred between them. When the two objects are then separated from each other, electrostatic charges may be generated in either or both of the objects. When the electrostatic charges of one conductive object discharge to another conductive object having a lower potential, this is so-called electrostatic discharge (ESD). Principal modes of ESD include a human body mode (HBM), a machine mode (MM), and a charge device mode (CDM).

If too many electrostatic charges build up at any one location on an electronic device, the built up electrostatic charges are liable to suddenly discharge and damage or even destroy components of the electronic device. Thus in a typical electronic device, an electrostatic discharge protection circuit is employed. The electrostatic discharge protection circuit discharges any electrostatic charges in a timely and safe manner.

However, even when an electrostatic discharge protection circuit is employed in an electronic device, electrostatic discharge that interferes with reset signal circuitry of the electronic device is still liable to occur. This can cause the electronic device to reset when a user does not intend a reset. A common result of erroneous resetting is that data stored in a memory of the electronic device is lost.

Therefore, a new method for overcoming the above-described problems is desired.

SUMMARY

In one preferred embodiment, an electronic device includes a reset control pin. A method for preventing the electronic device from erroneously resetting due to electrostatic discharge includes providing a timer, and setting a reset condition of the reset control pin utilizing the timer. If the reset condition is satisfied, the electronic device resets. The reset condition is such that a user of the electronic device can readily satisfy the condition by manual operation of the electronic device, yet such that an electrostatic discharge can virtually never satisfy the condition.

In another preferred embodiment, an electronic device includes a reset control pin. A method for preventing the electronic device from erroneously resetting due to electrostatic discharge includes providing a timer and a voltage pulse counter, and setting a reset condition of the reset control pin utilizing the timer and the voltage pulse counter. The voltage pulse counter counts a number of electrostatic discharges that occur in the electronic device. If the reset condition is satisfied, the electronic device resets. The reset condition is such that a user of the electronic device can readily satisfy the condition by manual operation of the electronic device, yet such that plural electrostatic discharges can virtually never satisfy the condition.

Other advantages and novel features will become more apparent from the following detailed description when taken in conjunction with the accompanying drawings.

DETAILED DESCRIPTION OF PREFERRED EMBODIMENTS

Figure 1:
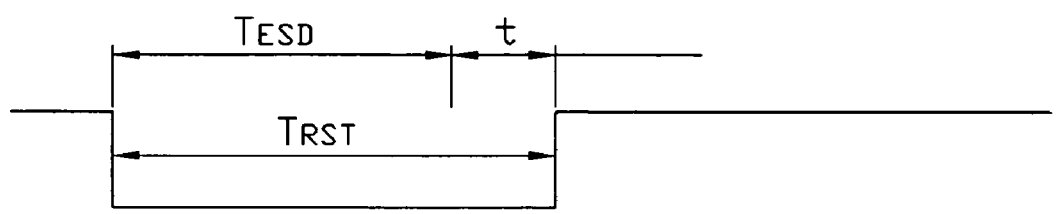
FIG. 1 is a schematic time chart relating to a method for preventing an electronic device from erroneously resetting due to electrostatic discharge according to a first embodiment of the present invention.

Referring to FIG. 1, this is a schematic time chart relating to a method for preventing an electronic device from erroneously resetting due to electrostatic discharge (ESD) according to a first embodiment of the present invention. The method includes the following steps.

First, an electronic device is provided. The electronic device includes a hardware reset control pin and a timer. The electronic device is set to have a predefined reset condition. If the reset condition is satisfied, the reset control pin performs a reset action to make the electronic device reset. The reset condition includes that the reset control pin is maintained at a low potential throughout a reset activation time period $T_{RST}$. The reset activation time $T_{RST}$ satisfies the following equation: $T_{RST}=T_{ESD}+t$, wherein $T_{ESD}$ represents a predetermined (predicted) electrostatic discharge time, and t represents a safe delay time. The electrostatic discharge time $T_{ESD}$ is generally 60 nanoseconds. The safe delay time t is set to be equal to or longer than 100 milliseconds, for example. That is, the reset activation time $T_{RST}$ is much longer than the electrostatic discharge time $T_{ESD}$. If the electrostatic discharge time $T_{ESD}$ is greater than 60 nanoseconds, the reset activation time $T_{RST}$ is correspondingly set to a value somewhat greater than 100 milliseconds.

When an ESD occurs in the electronic device, the reset control pin is set at a low potential as a result, and the timer is triggered to start measuring the reset activation time $T_{RST}$. When the ESD has finished, the timer is triggered to stop. Although the reset control pin is set at the low potential by the occurrence of an ESD, the time measured by the timer cannot reach the reset activation time $T_{RST}$ because the reset activation time $T_{RST}$ is set to be much longer than the predicted ESD time $T_{ESD}$. That is, under normal foreseen circumstances, the reset condition can never be satisfied by an ESD. The reset control pin cannot perform a reset action as a result of an ESD, and the electronic device does not reset.

In contrast, the reset control pin can be set to the low potential by, for example, a user pressing a reset button on the electronic device. The reset control pin can be maintained at the low potential by the user continuing to press the reset button. Once the discharge time $T_{ESD}$ has elapsed (e.g., after 100 milliseconds), the user can release the reset button because the reset condition is satisfied. Thereupon the reset control pin performs a reset action, and the electronic device resets.

In summary, the method includes appropriately setting the reset condition of the electronic device. The reset condition can virtually never be satisfied by an ESD. Thus, the electronic device is efficiently prevented from erroneously resetting due to ESD.

Figure 2:
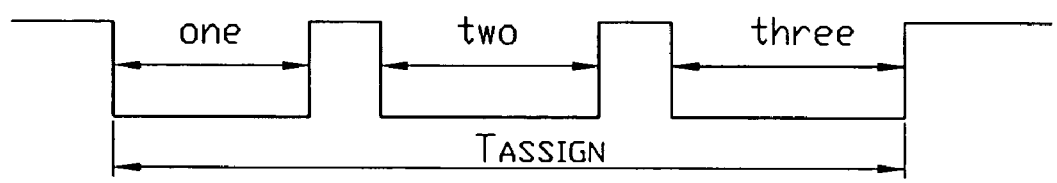
FIG. 2 is a schematic time chart relating to a method for preventing an electronic device from erroneously resetting due to electrostatic discharge according to a second embodiment of the present invention.

Referring to FIG. 2, this is a schematic time chart relating to a method for preventing an electronic device from erroneously resetting due to ESD according to a second embodiment of the present invention. The method includes the following steps of: providing an electronic device including a reset control pin; setting an assigned time period $T_{ASSIGN}$; providing a timer used to measure the passing of the assigned time $T_{ASSIGN}$; providing a voltage pulse counter used to count a number of occurrences of pulses of ESD during the assigned time $T_{ASSIGN}$; setting a predefined reset condition for the electronic device; and resetting the electronic device if the reset condition is satisfied. The reset condition includes that the reset control pin is maintained at a low potential throughout the assigned time $T_{ASSIGN}$, and that the number of pulses of ESD occurring during the assigned time $T_{ASSIGN}$ reaches a minimum threshold number.

For example, an appropriate threshold number of ESD pulses may set as 4, based on the particular predetermined assigned time $T_{ASSIGN}$, and based on predicted occurrences of ESD. When a first ESD pulse occurs in the electronic device, the reset control pin is set at a low potential as a result. At the same time, the timer is triggered to start measuring the assigned time $T_{ASSIGN}$, and the pulse counter counts the number of pulses occurring in the assigned time $T_{ASSIGN}$ as one. If a second ESD pulse occurs, the pulse counter changes the ESD pulse count to two. If a third ESD pulse occurs, the pulse counter changes the ESD pulse count to three. When the assigned time $T_{ASSIGN}$ measured by the timer elapses, the pulse counter stops counting. In this example, the number of ESD pulses counted by the pulse counter is 3, therefore the threshold ESD pulse number is not reached. That is, the reset condition is not satisfied. Thus, the reset control pin does not perform a reset action, and the electronic device does not reset.

The threshold number of ESD pulses is not limited to 4, and can be set according to the particular predicted occurrences of ESD. Thus, although the reset control pin is set at the low potential by the occurrence of the first ESD, the number of ESD pulses measured by the pulse counter cannot reach the threshold ESD pulse number within the assigned time $T_{ASSIGN}$, because the threshold ESD pulse number is set to be much higher than the predicted number of ESD pulses. That is, under normal foreseen circumstances, the reset condition can never be satisfied by plural ESDs. The reset control pin cannot perform a reset action as a result of plural ESDs, and the electronic device does not reset.

In contrast, the reset control pin can be set to the low potential by, for example, a user pressing a reset button on the electronic device. The reset control pin can be maintained at the low potential by the user continuing to press the reset button. Once the assigned time $T_{ASSIGN}$ has elapsed (e.g., after 100 milliseconds), the user can release the reset button because the reset condition is satisfied. Thereupon the reset control pin performs a reset action, and the electronic device resets.

It is believed that the present embodiments and their advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A method for preventing an electronic device from erroneously resetting due to electrostatic discharge, the electronic device comprising a reset control pin, the method comprising:

providing a timer and a voltage pulse counter; and setting a reset condition of the reset control pin;

wherein if the reset condition is satisfied, the electronic device resets;

wherein the voltage pulse counter is configured to count a number of occurrences of pulses of electrostatic discharge during an assigned time, the timer is configured to measure the assigned time, wherein the reset condition comprises that the reset control pin is maintained at a low potential throughout the assigned time and that the number of occurrences of pulses of electrostatic discharge during the assigned time reaches a minimum threshold number.

2. The method as claimed in claim 1, wherein the minimum threshold number is equal to or greater than 2.

3. The method as claimed in claim 2, wherein the minimum threshold number is equal to 4.

4. The method as claimed in claim 1, wherein the minimum threshold number is greater than the number of occurrences of pulses of electrostatic discharge during the assigned time.

5. The method as claimed in claim 1, wherein when the assigned time measured by the timer elapses, the voltage pulse counter stops counting.

6. A method for preventing an electronic device from erroneously resetting due to electrostatic discharge, the electronic device comprising a reset control pin, the method comprising:

providing a voltage pulse counter configured to count a number of occurrences of pulses of electrostatic discharge during an assigned time;

providing a timer configured to measure the assigned time; and setting a reset condition of the reset control pin for resetting the electronic device, the reset condition comprising that the reset control pin is maintained at a low potential throughout the assigned time and that the number of occurrences of pulses of electrostatic discharge during the assigned time reaches a minimum threshold number;

wherein if the reset condition is satisfied, the electronic device resets.

7. A method for preventing an electronic device from erroneously resetting due to electrostatic discharge, the electronic device comprising a reset control pin, the method comprising:

providing a voltage pulse counter configured to count a number of occurrences of pulses which enables the reset control pin to keep at a predetermined potential during an assigned time, wherein the predetermined potential enables the reset control pin to be active;

providing a timer configured to measure the assigned time; and setting a reset condition of the reset control pin for resetting the electronic device, the reset condition comprising that the number of occurrences of pulses reaches at least two;

wherein if the reset condition is satisfied, the electronic device resets.

8. The method as claimed in claim 7, wherein the number of occurrences of pulses which sets the reset control pin at the predetermined potential during the assigned time is equal to two.

9. The method as claimed in claim 7, wherein the number of occurrences of pulses which sets the reset control pin at the predetermined potential during the assigned time is equal to 3.

10. The method as claimed in claim 7, wherein the number of occurrences of pulses which sets the reset control pin at the predetermined potential during the assigned time is greater than the number of occurrences of pulses of electrostatic discharge during the assigned time.

11. The method as claimed in claim 7, wherein when the assigned time measured by the timer elapses, the voltage pulse counter stops counting.

12. The method as claimed in claim 7, wherein the predetermined potential is a low potential.

* * * * *